US012603274B2

(12) United States Patent
Miki et al.

(10) Patent No.: US 12,603,274 B2
(45) Date of Patent: Apr. 14, 2026

(54) LITHIUM ION SECONDARY BATTERY AND MANUFACTURING METHOD FOR NEGATIVE ELECTRODE FOR LITHIUM ION SECONDARY BATTERY

(71) Applicant: Vehicle Energy Japan Inc., Hitachinaka (JP)

(72) Inventors: Takeshi Miki, Hitachinaka (JP); Shuichi Suzuki, Hitachinaka (JP); Yusuke Tachikawa, Hitachinaka (JP)

(73) Assignee: Vehicle Energy Japan Inc., Hitachinaka (JP)

( * ) Notice: Subject to any disclaimer, the term of this patent is extended or adjusted under 35 U.S.C. 154(b) by 556 days.

(21) Appl. No.: 18/040,707

(22) PCT Filed: Sep. 21, 2021

(86) PCT No.: PCT/JP2021/034657
§ 371 (c)(1),
(2) Date: Feb. 6, 2023

(87) PCT Pub. No.: WO2022/185584
PCT Pub. Date: Sep. 9, 2022

(65) Prior Publication Data
US 2023/0290931 A1 Sep. 14, 2023

(30) Foreign Application Priority Data
Mar. 3, 2021 (JP) ................................. 2021-033765

(51) Int. Cl.
*H01M 4/36* (2006.01)
*H01M 4/131* (2010.01)
(Continued)

(52) U.S. Cl.
CPC ........... *H01M 4/364* (2013.01); *H01M 4/131* (2013.01); *H01M 4/133* (2013.01); *H01M 4/48* (2013.01);
(Continued)

(58) Field of Classification Search
CPC ....... H01M 10/0525; H01M 2004/027; H01M 4/0404; H01M 4/131; H01M 4/133;
(Continued)

(56) References Cited

U.S. PATENT DOCUMENTS 5,432,029 A 7/1995 Mitate et al.
5,591,547 A 1/1997 Yoneda et al.
(Continued)

FOREIGN PATENT DOCUMENTS

JP 06-325753 A 11/1994
JP 08-045499 A 2/1996
(Continued)

OTHER PUBLICATIONS

Machine translation KR2018013776A (Year: 2018).*
International Search Report, PCT/JP2021/034657, Nov. 16, 2021, 2 pgs.

*Primary Examiner* — Victoria H Lynch
(74) *Attorney, Agent, or Firm* — Volpe Koenig

(57) ABSTRACT

A lithium ion secondary battery is provided which has a sufficient discharge capacity and has a low internal resistance in a low SOC range. The lithium ion secondary battery includes: a positive electrode including a positive electrode mixture containing a positive electrode active material represented by the following formula: $Li_{1+x}M^4O_2$; (where X satisfies $-0.15 \leq X \leq 0.15$, $M^4$ represents a group of elements including at least one selected from the group consisting of Mn and Al, Ni, and Co.); and a negative electrode including a negative electrode mixture containing a negative electrode (Continued)

active material containing a carbon-based material, a negative electrode additive containing a copper oxide, and a binder, in which the negative electrode mixture contains the copper oxide in an amount of 0.5 wt % or more and 15 wt % or less based on the total weight of the negative electrode active material and the negative electrode additive.

11 Claims, 3 Drawing Sheets

(51) Int. Cl.

| | | |
|---|---|---|
| *H01M 4/133* | (2010.01) | |
| *H01M 4/48* | (2010.01) | |
| *H01M 4/587* | (2010.01) | |
| *H01M 10/0525* | (2010.01) | |
| *H01M 4/02* | (2006.01) | |

(52) U.S. Cl.
CPC ....... *H01M 4/587* (2013.01); *H01M 10/0525* (2013.01); *H01M 2004/027* (2013.01)

(58) Field of Classification Search
CPC .. H01M 4/1391; H01M 4/1393; H01M 4/364; H01M 4/48; H01M 4/485; H01M 4/505; H01M 4/525; H01M 4/587; H01M 4/62; H01M 4/625; Y02E 60/10
See application file for complete search history.

(56) References Cited

U.S. PATENT DOCUMENTS

| | | |
|---|---|---|
| 2020/0303776 A1 | 9/2020 | Watanabe |
| 2021/0057722 A1 | 2/2021 | Kawada et al. |

FOREIGN PATENT DOCUMENTS

| | | | | |
|---|---|---|---|---|
| JP | 2020-123494 A | 8/2020 | | |
| KR | 2003-0033715 A | 5/2003 | | |
| KR | 10-2009-0010361 A | 1/2009 | | |
| KR | 20180137776 A | * 12/2018 | ........... | H01M 4/624 |
| WO | 2017/159267 A1 | 9/2017 | | |
| WO | 2019/159563 A1 | 8/2019 | | |

* cited by examiner

LITHIUM ION SECONDARY BATTERY AND MANUFACTURING METHOD FOR NEGATIVE ELECTRODE FOR LITHIUM ION SECONDARY BATTERY

TECHNICAL FIELD

The present invention relates to a lithium ion secondary battery and a manufacturing method for a negative electrode for the lithium ion secondary battery.

BACKGROUND ART

In the automobile industry, fuel efficiency regulations and environmental regulations are being strengthened. In order to comply with these regulations, technological development of electric vehicles that use batteries as a power source and do not emit carbon dioxide, and fuel cell vehicles that use hydrogen as a fuel source are attracting attention. However, the electric vehicles and the fuel cell vehicles have various problems such as insufficient infrastructure. Therefore, PHEVs (Plug-in Hybrid Electric Vehicles) and HEV (Hybrid Electric Vehicles) which use both an internal combustion engine and a battery as power sources and emit less carbon dioxide are promising candidates for compliance with the fuel efficiency regulations and the environmental regulations.

Lithium ion secondary batteries are used in the PHEV or the HEV. PTL 1 describes a positive electrode active material including lithium nickel manganese tungsten composite oxide particles having a hexagonal layered structure, which enables high capacity and high output of a lithium ion secondary battery. PTL 2 describes a lithium ion secondary battery having a negative electrode composed of a binder and a copper oxide adhered graphite composite produced by generating a copper oxide on the surface of graphite particles by a chemical reaction, and describes that the lithium ion secondary battery can have a high discharge capacity.

CITATION LIST

Patent Literature

PTL 1: JP 2020-123494 A
PTL 2: JP H8-45499 A

SUMMARY OF INVENTION

Technical Problem

In the PHEV or the HEV, a lithium ion secondary battery is required that have an adequate discharging capacity and can provide a stable power in a range of a lower charge rate (State of Charge, SOC). In order to obtain the stable power in the low SOC range, it is required to reduce an internal resistance of the lithium ion secondary battery in the low SOC range. However, according to the present inventors, the lithium ion secondary batteries using the positive electrode active material described in PTL 1 tend to have the higher internal resistance in the low SOC range. In addition, PTL 2 does not describe any internal resistance in the low SOC range.

Therefore, the present invention provides a lithium ion secondary battery having the sufficient discharge capacity and having the low internal resistance in the low SOC range.

Solution to Problem

According to one aspect of the present invention, a lithium ion secondary battery is provided which includes:

a positive electrode including a positive electrode mixture containing a positive electrode active material represented by the following formula (1):

$$Li_{1+x}M^4O_2 \tag{1}$$

(where X satisfies $-0.15 \leq X \leq 0.15$, $M^4$ represents a group of elements including at least one selected from the group consisting of Mn and Al, Ni, and Co.); and a negative electrode including a negative electrode mixture containing a negative electrode active material containing a carbon-based material, a negative electrode additive containing a copper oxide, and a binder, in which the negative electrode mixture contains the copper oxide in an amount of 0.5 wt % or more and 15 wt % or less based on the total weight of the negative electrode active material and the negative electrode additive.

According to another aspect of the present invention, a manufacturing method for a negative electrode for a lithium ion secondary battery is provided which includes the steps of:

preparing a mixture of a negative electrode active material containing a carbon-based material, a negative electrode additive containing a copper oxide, and a binder; and applying the mixture to a negative electrode current collector;

in which the mixture contains the copper oxide in an amount of 0.5 wt % or more and 15 wt % or less based on the total weight of the negative electrode active material and the negative electrode additive.

This specification includes the disclosure of Japanese Patent Application No. 2021-033765, which is the basis of priority of the present application.

Advantageous Effects of Invention

The lithium ion secondary batteries of the present disclosure have an adequate discharging capacity and a low internal resistance in a low SOC range.

DESCRIPTION OF EMBODIMENTS

Figure 1:
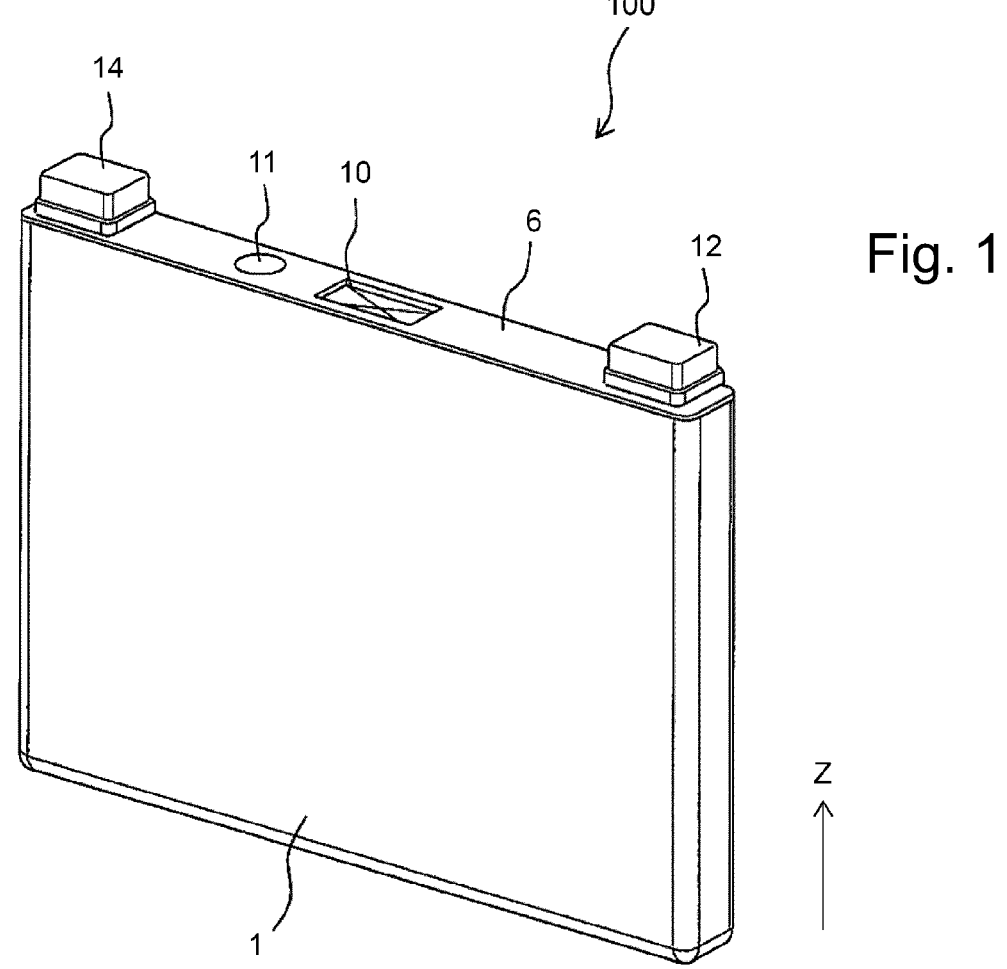
FIG. 1 is an external perspective view of a lithium ion secondary battery.

Hereinafter, embodiments will be described with reference to the drawings as appropriate. The present invention is not limited to the following embodiments, and various design changes can be made without departing from the spirit of the present invention described in the claims. In the drawings referred to in the following description, the same members or members having the same function are denoted by the same reference numerals, and repeated description thereof may be omitted. In addition, the dimensional ratios in the drawings may be different from the actual ratios for convenience of explanation, or a part of the members may be omitted from the drawings. In addition, in the present application, the numerical range represented by the symbol "–" includes each of the numerical values described before and after the symbol "–" as the lower limit value and the upper limit value.

Figure 2:
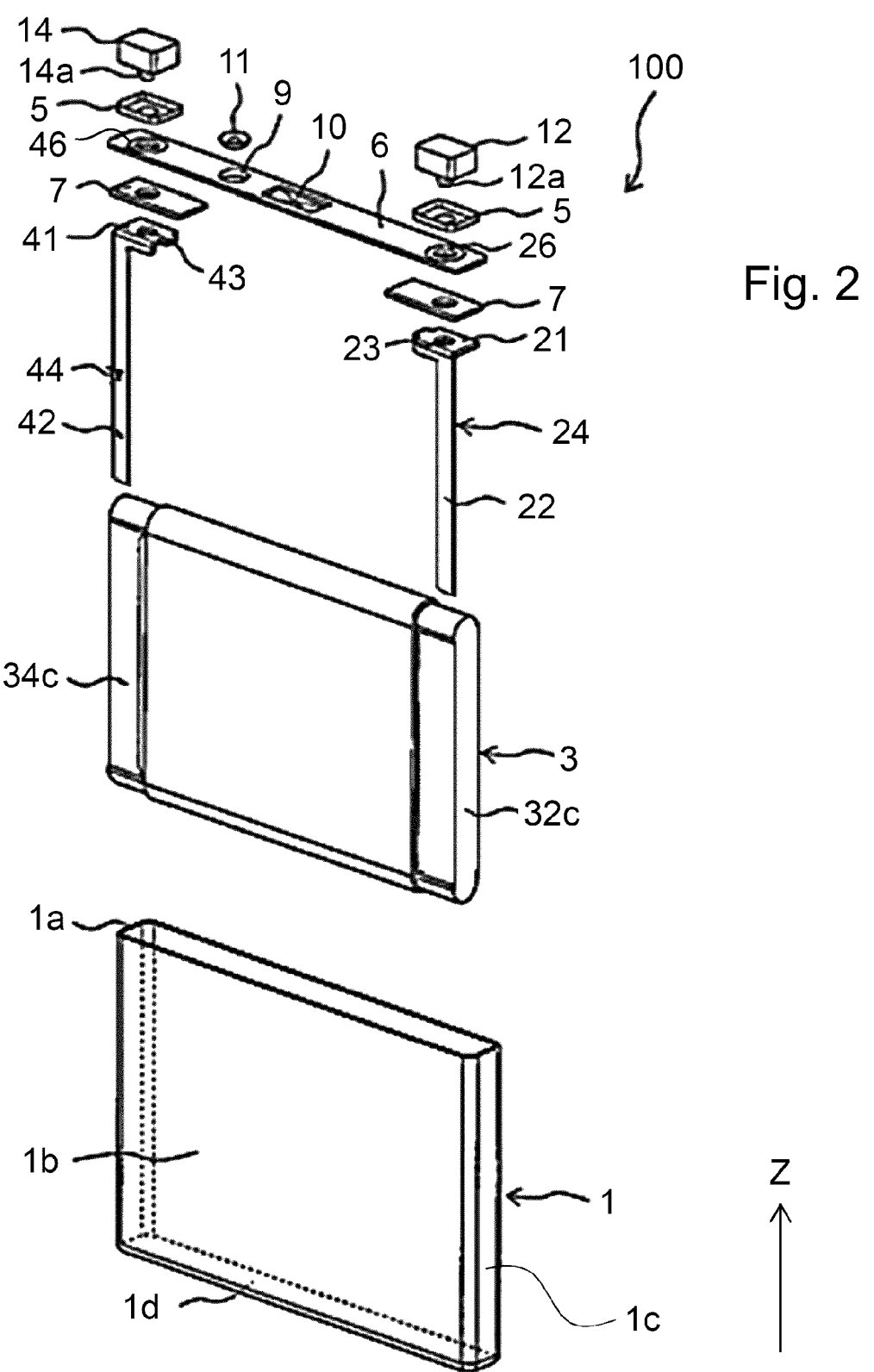
FIG. 2 is an exploded perspective view of a lithium ion secondary battery.

A lithium ion secondary battery 100 according to the embodiment shown in FIGS. 1 and 2 includes a battery can 1 and a battery lid 6. The battery can 1 has a rectangular bottom surface 1d, a side surface including a pair of opposed wide side surfaces 1b having a relatively large area rising from the bottom surface 1d and a pair of opposed narrow side surfaces 1c having a relatively small area, and an opening 1a opened upward at an upper end of the wide side surfaces 1b and the narrow side surfaces 1c. Here, "upward" means the Z direction in FIGS. 1 and 2.

The opening 1a of the battery can 1 is sealed by the battery lid 6. The battery lid 6 has a substantially rectangular flat plate shape and seals the battery can 1 by being welded so as to close the opening 1a of the battery can 1.

The battery lid 6 is integrally provided with a gas discharge valve 10. When the pressure in the battery can 1 increases, the gas discharge valve 10 is cleaved and the gas is discharged from the inside of the battery can 1, and the pressure in the battery can 1 decreases. This ensures the safety of the lithium ion secondary battery 100.

A liquid injection port 9 for injecting an electrolytic solution into the battery can 1 is formed in the battery lid 6. The liquid injection port 9 is sealed by the liquid injection plug 11 after the electrolytic solution is injected into the battery can 1. The liquid injection plug 11 is joined to the battery lid 6 by a laser welding to seal the liquid injection port 9, thereby sealing the lithium ion secondary battery 100.

Further, a positive electrode side through hole 46 and a negative electrode side through hole 26 are formed in the battery lid 6.

A positive electrode external terminal 14 and a negative electrode external terminal 12 are provided above the battery lid 6. A positive electrode current collector plate 44 and a negative electrode current collector plate 24 are provided below the battery lid 6 and inside the battery can 1.

Examples of the material for forming the positive electrode external terminal 14 and the positive electrode current collector plate 44 include an aluminum alloy, and examples of the material for forming the negative electrode external terminal 12 and the negative electrode current collector plate 24 include a copper alloy.

The positive electrode external terminal 14 and the negative electrode external terminal 12 each have a welded joint portion to which a bus bar or the like is welded. The welded joint has a rectangular parallelepiped block shape protruding upward from the battery lid 6. The lower surface of the welded joint faces the surface of the battery lid 6, and the upper surface of the welded joint is positioned at a predetermined height and is substantially parallel to the battery lid 6.

The positive electrode current collector plate 44 has a rectangular plate-shaped positive electrode current collector plate base portion 41 opposed to the lower surface of the battery lid 6, and a positive electrode side connecting end portion 42 extending from the side end of the positive electrode current collector plate base portion 41 toward the bottom surface 1d along the wide side surface 1b of the battery can 1. Similarly, the negative electrode current collector plate 24 has a rectangular plate-shaped negative electrode current collector plate base portion 21 opposed to the lower surface of the battery lid 6, and a negative electrode side connecting end portion 22 extending from the side end of the negative electrode current collector plate base portion 21 toward the bottom surface 1d along the wide side surface 1b of the battery can 1. Positive electrode side opening holes 43 and negative electrode side opening holes 23 are formed in the positive electrode current collector plate base portion 41 and the negative electrode current collector plate base portion 21, respectively.

A positive electrode connecting portion 14a and a negative electrode connecting portion 12a are provided so as to protrude from the lower surfaces of the positive electrode external terminal 14 and the negative electrode external terminal 12, respectively. The positive electrode connection portion 14a and the negative electrode connection portion 12a are formed integrally with the positive electrode external terminal 14 and the negative electrode external terminal 12, respectively.

The positive electrode connecting portion 14a has a cylindrical shape that can be inserted into the positive electrode side through hole 46 of the battery lid 6 and the positive electrode side opening hole 43 of the positive electrode current collector plate base portion 41. Similarly, the negative electrode connecting portion 12a has a cylindrical shape that can be inserted into the negative electrode side through hole 26 of the battery lid 6 and the negative electrode side opening hole 23 of the negative electrode current collector plate base portion 21. The positive electrode connecting portion 14a passes through the positive electrode side through hole 46 of the battery lid 6 and the positive electrode side opening hole 43 of the positive electrode current collector plate base portion 41, and passes through the battery lid 6 and the positive electrode current collector plate base portion 41. The positive electrode external terminal 14 and the positive electrode current collector plate 44 are electrically connected to each other via the positive electrode connecting portion 14a, and are fixed to the battery lid 6. Similarly, the negative electrode connecting portion 12a passes through the negative electrode side through hole 26 of the battery lid 6 and the negative electrode side opening hole 23 of the negative electrode current collector plate base portion 21, and passes through the battery lid 6 and the negative electrode current collector plate base portion 21. The negative electrode external terminal 12 and the negative electrode current collector plate 24 are electrically connected to each other via the negative electrode connecting portion 12a, and are fixed to the battery lid 6.

The positive electrode external terminal 14 is electrically connected to a wound group 3, which will be described later, via the positive electrode connecting portion 14a and the positive electrode current collector plate 44. Similarly, the negative electrode external terminal 12 is electrically connected to the wound group 3 via the negative electrode connecting portion 12a and the negative electrode current collector plate 24. When the lithium ion secondary battery 100 is charged, electricity is supplied from an external power source to the wound group 3 via the positive electrode external terminal 14, the positive electrode connection portion 14a, the positive electrode current collector plate 44, and the negative electrode external terminal 12, the negative electrode connection portion 12a, and the negative electrode current collector plate 24. When the lithium ion secondary battery 100 is discharged, electricity is supplied from the wound group 3 to external loads via the positive electrode external terminal 14, the positive electrode connection portion 14a, the positive electrode current collector plate 44, and the negative electrode external terminal 12, the negative electrode connection portion 12a, and the negative electrode current collector plate 24.

In order to electrically insulate the positive electrode current collector plate 44, the negative electrode current collector plate 24, the positive electrode external terminal 14, and the negative electrode external terminal 12 from the battery lid 6, a gasket 5 is provided between each of the positive electrode external terminal 14 and the negative electrode external terminal 12 and the battery lid 6, and an insulating plate 7 is provided between each of the positive electrode current collector plate 44 and the negative electrode current collector plate 24 and the battery lid 6. Examples of the material of the insulating plate 7 and the gasket 5 include insulating resin materials such as polybutylene terephthalate, polyphenylene sulfide, and perfluoroalkoxy fluororesin.

An electrolytic solution and a wound group 3 are accommodated in the battery can 1.

The electrolytic solution is injected into the battery can 1 through the liquid injection port 9. As the electrolytic solution, for example, a non-aqueous electrolytic solution in which a lithium salt such as lithium hexafluoride phosphate (LiPF$_6$) is dissolved in a carbonate-based organic solvent such as ethylene carbonate can be used.

Figure 3:
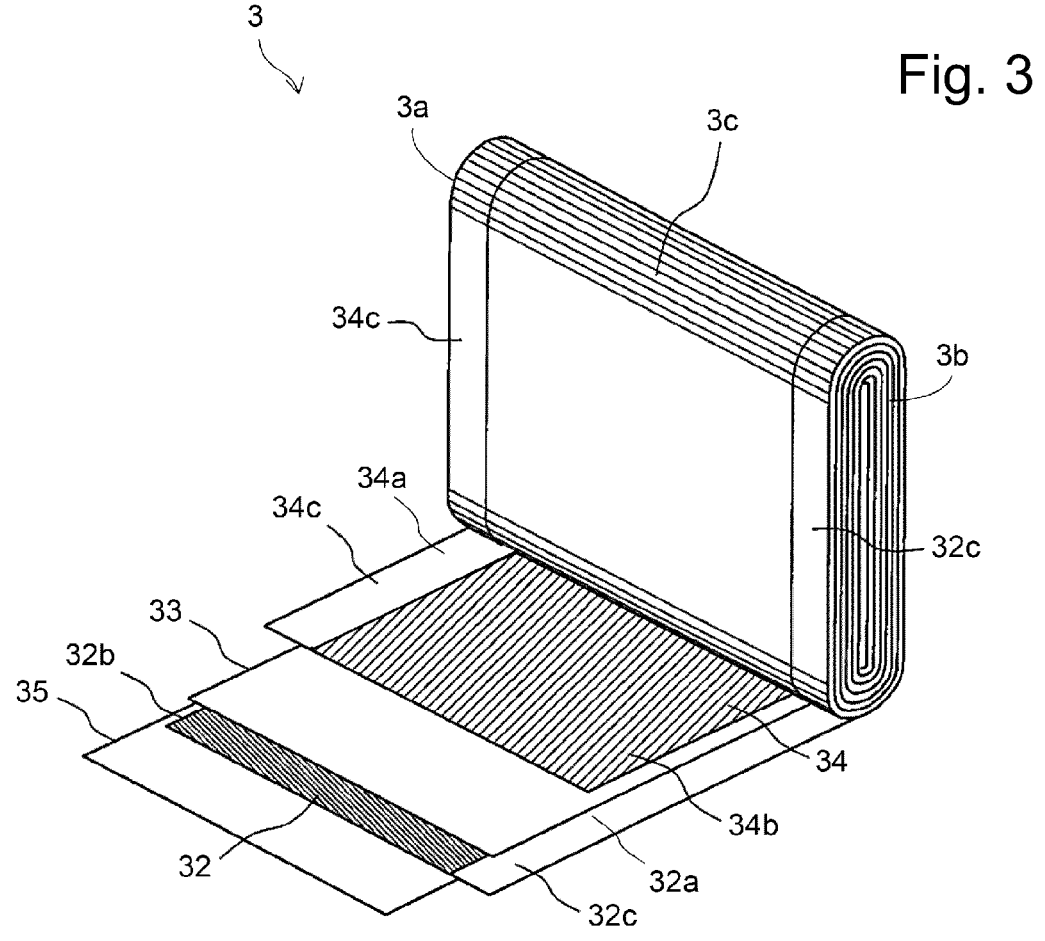
FIG. 3 is a perspective view in which a part of a wound group is developed.

As shown in FIG. 3, the wound group 3 includes a negative electrode 32, a positive electrode 34, and two separators 33, 35. The separator 35, the negative electrode 32, the separator 33, and the positive electrode 34 are stacked in this order and wound in a flat shape. The separator 35 is located on the outermost periphery of the wound group 3, and the negative electrode 32 is located on the inner side thereof. The two separators 33, 35 electrically insulate the positive electrode 34 and the negative electrode 32 from each other.

The wound group 3 has a pair of opposed end faces 3a, 3b perpendicular to the winding shaft and a side face 3c between the pair of end faces 3a, 3b. The side surface 3c has a pair of curved portions opposed to each other having a semicircular cross section, and a flat portion continuously formed between the pair of curved portions. The wound group 3 is arranged in the battery can 1 such that the flat portion of the side surface 3c and the wide side surface 1b of the battery can 1 are substantially parallel to each other.

The positive electrode 34 includes a positive electrode current collector 34a and positive electrode mixture layers 34b formed on both surfaces of the positive electrode current collector 34a.

The positive electrode current collector 34a is made of any material that is highly conductive and does not alloy with lithium ions. The positive electrode current collector 34a may have a plate-like (sheet-like) configuration. As the positive electrode current collector 34a, for example, an aluminum foil can be used. One end of the positive electrode current collector 34a is provided with a portion 34c that is not covered with the positive electrode mixture layers 34b (hereinafter referred to as "positive electrode current collector exposed portion"). The positive electrode current collector exposed portion 34c is provided on the end face 3a of the wound group 3 and in the vicinity thereof. The positive electrode current collector exposed portion 34c faces and is electrically connected to the positive electrode side connecting end portion 42 of the positive electrode current collector plate 44.

The positive electrode mixture layer 34b contains a positive electrode active material represented by the following formula (1):

$$Li_{1+x}M^4O_2 \tag{1}$$

(where X satisfies −0.15≤X≤0.15, M$^4$ represents a group of elements including at least one selected from the group consisting of Mn and Al, Ni, and Co.)

By satisfying −0.15≤X≤0.15, the positive electrode active material has a high true density and a high reversibility.

Since M$^4$ includes at least one selected from the group consisting of Mn and Al in addition to Ni and Co, the positive electrode active material has a high thermal stability and a high stability in a high potential condition. Accordingly, the lithium ion secondary battery 100 has a high safety.

M$^4$ may further include at least one selected from the group consisting of Zr, Ti, Cr, Fe, Cu, Zn, Ge, Sn, Mg, Ag, Ta, Nb, B, P, Ca, Sr, and Ba. When M$^4$ contains Zr, the internal resistance of the lithium ion secondary battery 100 at low temperature is reduced.

The content of Zr may be 0.1 to 2.0 mol %, and in particular 0.2 to 1.0 mol %, relative to the total amount of Ni, Co, Mn and Al. In addition, the proportion of the elements other than Ni, Co, Mn and Al in all the elements constituting M$^4$ may be 10 mol % or less, and particularly 3 mol % or less. Accordingly, the lithium ion secondary battery 100 can have a sufficient discharge capacity.

The amounts of the respective elements in the positive electrode active material can be measured by ICP method (Inductive Coupled Plasma).

The positive electrode mixture layer 34b may further include a binder and a conductive agent.

As the binder, for example, polyvinylidene fluoride (PVdF), polytetrafluoroethylene (PTFE), polyethylene, polystyrene, polybutadiene, polyacrylonitrile, polyvinyl fluoride, polypropylene fluoride, polychloroprene fluoride, butyl rubber, nitrile rubber, styrene butadiene rubber (SBR), polysulfide rubber, nitrocellulose, cyanoethyl cellulose, various latexes, acrylic resins, or a mixture thereof can be used.

A carbon-based material can be used as the conductive agent. The carbon-based material may be crystalline carbon, amorphous carbon, or a mixture thereof. Examples of the crystalline carbon include artificial graphite, natural graphite (e.g., scaly graphite), or a mixture thereof. Examples of the amorphous carbon include carbon black (e.g., acetylene black, Ketjen black, channel black, furnace black, lamp black, thermal black, or a mixture thereof).

The positive electrode 34 can be formed, for example, as follows. A positive electrode active material, and optionally a conductive agent and a binder are dispersed in a solvent (e.g., N-methyl-2-pyrrolidone (NMP)) to prepare a pasty or slurry-like mixture. The mixture is applied to the positive electrode current collector 34a, dried, and optionally calendered to form a positive electrode mixture layer 34b. Thereby, the positive electrode 34 is obtained.

The negative electrode 32 includes a negative electrode current collector 32a and negative electrode mixture layers 32b formed on both surfaces of the negative electrode current collector 32a.

The negative electrode current collector 32a is formed of any material that is highly conductive and does not alloy with lithium ions. One end of the negative electrode current collector 32a is provided with a portion 32c that is not covered with the negative electrode mixture layers 32b (hereinafter referred to as "negative electrode current collector exposed portion"). The negative electrode current collector exposed portion 32c is provided on the end face 3b of the wound group 3 and in the vicinity thereof. The negative electrode current collector exposed portion 32c faces and is electrically connected to the negative electrode side connecting end portion 22 of the negative electrode current collector plate 24.

The negative electrode mixture layer 32*b* includes a negative electrode active material, a negative electrode additive, and a binder.

The negative electrode active material includes, or consists essentially of, a carbon-based material capable of intercalating and deintercalating lithium ions. Examples of such carbon-based material include carbon materials such as natural graphite, artificial graphite, non-graphitizable carbon (hard carbon), graphitizable carbon (soft carbon), graphite coated with amorphous carbon, a mixture of carbon black as a conductive aid (e.g., acetylene black, Ketjen black, channel black, furnace black, lamp black, thermal black) and graphite, a composite obtained by coating the mixture with amorphous carbon, a mixture of graphite and non-graphitizable carbon or graphitizable carbon, and a mixture thereof. The negative electrode active material may be in particulate form. The shape of the particulate negative electrode active material is not particularly limited, and may have, for example, a spherical shape, a scaly shape, a fibrous shape, or a shape obtained by pulverizing them.

The negative electrode additive includes or consists essentially of a copper oxide. The copper oxide may be copper oxide (I) (Cu₂O), copper oxide (II) (CuO), or a mixture thereof. The negative electrode additive may be particulate. The shape of the particulate negative electrode additive is not particularly limited, and may have, for example, a spherical shape, a scaly shape, a fibrous shape, or a shape obtained by pulverizing them. The particulate anode additive may be a particle containing copper oxide (I) (Cu₂O), copper oxide (II) (CuO), or a mixture thereof, or may be a particle consisting essentially of copper oxide (I) (Cu₂O), copper oxide (II) (CuO), or a mixture thereof. These various particulate negative electrode additives may be used singly or in combination.

In the negative electrode mixture layer 32*b*, the particulate negative electrode active material and the particulate negative electrode additive may be present as separate particles that are not composited with each other. Accordingly, the particulate negative electrode active materials can be electrically connected to each other without being inhibited by the particulate negative electrode additive having a high electrical resistance, and an increase in the internal resistance of the lithium ion secondary battery can be suppressed. The particulate negative electrode active material may have a median diameter of 4 to 20 μm. The particulate negative electrode additive may have a median diameter smaller than the median diameter of the particulate negative electrode active material and may have the median diameter of 1 to 10 μm. Accordingly, the particulate negative electrode active materials can be electrically connected to each other without being inhibited by the particulate negative electrode additive having a high electrical resistance, and thus an increase in the internal resistance of the lithium ion secondary battery can be suppressed. The median diameter d50 of the particulate negative electrode active material and the particulate negative electrode additive is determined based on a volume-based particle size distribution measured by a laser diffractive particle size distribution measuring apparatus.

The negative electrode mixture layer 32*b* contains the copper oxide in an amount of 0.5 wt % or more and 15 wt % or less based on the total weight of the negative electrode active material and the negative electrode additive. As a result, the lithium ion secondary battery can have a low internal resistance and a high battery capacity, as shown in Examples below. When the copper oxide is Cu₂O, the negative electrode mixture layer 32*b* may contain the copper oxide in an amount of 0.9 wt % or more and 15 wt % or less based on the total weight of the negative electrode active material and the negative electrode additive. Accordingly, the lithium ion secondary battery can have a lower internal resistance. When the copper oxide is Cu₂O, the negative electrode mixture layer 32*b* may contain the copper oxide in an amount of 1.4 wt % or more and 12 wt % or less based on the total weight of the negative electrode active material and the negative electrode additive. Accordingly, the lithium ion secondary battery can have particularly low internal resistance and particularly high battery capacity. When the copper oxide is CuO, the negative electrode mixture layer 32*b* may contain the copper oxide in a concentration of 0.5 wt % or more and 8.3 wt % or less, or 0.78 wt % or more and 6.7 wt % or less based on the total weight of the negative electrode active material and the negative electrode additive. Accordingly, the lithium ion secondary battery can have a particularly low internal resistance and a particularly high battery capacity.

Cu₂O and CuO react as represented by the following formulas:

$$Cu_2O + 2Li^+ + 2e^- \rightarrow 2Cu + Li_2O$$

$$CuO + 2Li^+ + 2e^- \rightarrow Cu + Li_2O$$

Theoretical capacitances of Cu₂O and CuO are each 375 mAh/g-Cu₂O, 674 mAh/g-CuO, and CuO has the theoretical capacitance of about 1.8 times Cu₂O. Therefore, for example, the effect obtained when the concentration of Cu₂O is 0.9 wt %, 15 wt % based on the total weight of the negative electrode active material and the negative electrode additive is approximately the same as the effect obtained when the concentration of CuO is 0.5 wt %, 8.3 wt % based on the total weight of the negative electrode active material and the negative electrode additive, respectively.

As the binder of the negative electrode mixture layer 32*b,* the same materials as those exemplified as those that can be used as the binder of the positive electrode mixture layer 34*b* can be used.

The negative electrode material mixture layer 32*b* may further include a dispersant. As the dispersant, carboxymethylcellulose (CMC) can be used.

The negative electrode 32 can be formed as follows, for example. First, a negative electrode active material containing a carbon-based material, a negative electrode additive containing a copper oxide, a binder, and optionally a dispersant are prepared. The negative electrode active material and the negative electrode additive may be in particulate form. The particulate negative electrode active material and the particulate negative electrode additive may be separate particles that are not composited with each other. The negative electrode active material, the negative electrode additive and the binder, and optionally the dispersant are dispersed in a solvent (e.g., N-methyl-2-pyrrolidone (NMP)) to prepare a pasty or slurry-like mixture. The composition contains the copper oxide in an amount of 0.5 wt % or more and 15 wt % or less based on the total weight of the negative electrode active material and the negative electrode additive. When the copper oxide is Cu₂O, the mixture may include the copper oxide in a concentration of 0.9 wt % or more and 15 wt % or less, or 1.4 wt % or more and 12 wt % or less based on the total weight of the negative electrode active material and the negative electrode additive. When the copper oxide is CuO, the mixture may include the copper oxide in a concentration of 0.5 wt % or more and 8.3 wt % or less, or 0.78 wt % or more and 6.7 wt % or less based on the total weight of the negative electrode active material and the negative electrode additive. The prepared mixture is applied to the surface of the negative electrode current collector 32a, dried, and optionally calendered to form a negative electrode mixture layer 32b. Thereby, the negative electrode 32 is obtained.

The separators 33, 35 have a function of preventing a short circuit between the positive electrode 34 and the negative electrode 32 and a function of holding a nonaqueous electrolyte. As the separators 33, 35, for example, a porous sheet made of a resin such as polyethylene (PE), polypropylene (PP), polyester, cellulose, or polyamide, or a laminated sheet thereof (for example, a sheet having a three-layer structure of PP/PE/PP) can be used.

A layer including an inorganic material (e.g., alumina particles) and a binder may be provided on one or both surfaces of the separators 33, 35. Accordingly, even when the lithium ion secondary battery 100 is used in an abnormal state (for example, when the temperature of the lithium ion secondary battery rises to 160° C. or higher due to overcharge, crushing, or the like), the separators 33, 35 are prevented from melting and the insulating function can be maintained. Therefore, the safety of the lithium ion secondary battery 100 is improved.

If necessary, a shaft core may be disposed on the innermost circumference of the wound group 3. The shaft core may be formed by winding a resin sheet having a higher bending stiffness than any of the positive electrode current collector, the negative electrode current collector, and the separators 33, 35.

EXAMPLES

Hereinafter, the present invention will be described in detail with reference to Examples, but the present invention is not limited to these Examples.

Examples 1 to 5

$Li_{1.0}Ni_{0.33}Co_{0.33}Mn_{0.33}O_2$ powder was prepared as a positive electrode active material. The elemental fraction in the positive electrode active material was determined by ICP spectrometry. Acetylene black was prepared as a conductive agent, and polyvinylidene fluoride (PVdF) was prepared as a binder.

The positive electrode active material, the conductive agent, and the binder were mixed in a weight ratio of 90:5:5. N-methyl-2-pyrrolidone (NMP) was added to the resulting mixture to adjust a viscosity to obtain a positive electrode slurry.

An aluminum foil having a thickness of 15 μm was prepared as a positive electrode current collector. A positive electrode slurry was applied to both surfaces of the positive electrode current collector by a slot die coating method to form a layer of the positive electrode slurry. The layer of the positive electrode slurry was then dried and pressed. As a result, a positive electrode having a positive electrode mixture layer formed on both surfaces of the positive electrode current collector was obtained.

Natural graphite particles coated with amorphous carbon as a negative electrode active material, copper oxide (I) ($Cu_2O$) particles as a negative electrode additive, styrene-butadiene rubber (SBR) as a binder, and carboxymethyl cellulose (CMC) as a dispersant were prepared. The volume-based particle size distributions of the natural graphite particles and the $Cu_2O$ particles were measured by a laser diffractive particle size distribution analyzer, and the median size d50 in the respective particle size distributions were determined. The median diameter of the natural graphite particles was 10 μm, and the median diameter of the $Cu_2O$ particles was 3 μm. The negative electrode active material, the negative electrode additive, the binder, and the dispersant were mixed in a weight ratio of 100−x:x:1:1. The values of x in the respective Examples is as shown in Table 1 and corresponds to the weight percent concentration of the negative electrode additive (i.e., the copper oxide) based on the total weight of the negative electrode active material and the negative electrode additive. Ion-exchanged water was added to the obtained mixture to adjust the viscosity, and a negative electrode slurry was obtained. A copper foil having a thickness of 10 μm was prepared as a negative electrode current collector. The negative electrode slurry was applied to both surfaces of the negative electrode current collector by a slot die coating method to form a negative electrode mixture layer. Then, the negative electrode mixture layer was dried and pressed. As a result, a negative electrode was obtained.

The separator, the negative electrode, the other separator, and the positive electrode were stacked in this order and wound. Thereby, the wound group as shown in FIG. 3 was produced. In addition, ethylene carbonate (EC) and dimethyl carbonate (DMC) were mixed in a volume ratio of 1:2, and $LiPF_6$ was dissolved in the obtained mixed liquid. As a result, a $LiPF_6$ solution of 1.0 mol/L was obtained as a nonaqueous electrolyte solution. A lithium ion secondary battery as shown in FIGS. 1 and 2 was manufactured using the wound group and the nonaqueous electrolyte solution.

Examples 6 to 8

Lithium ion secondary batteries were prepared in the same manner as in Example 1, except that copper oxide (II) (CuO) particles were used as the negative electrode additive, and the negative electrode active material, the negative electrode additive, the binder, and the dispersant were mixed in the weight ratio of 100−x:x:1:1 (x in the examples is as shown in Table 1). The median diameter of CuO particles obtained in the same manner as in Example 1 was 3 micrometers.

Comparative Example 1

A lithium ion secondary battery was prepared in the same manner as in Example 1, except that the negative electrode active material, the binder, and the dispersant were mixed in the weight ratio of 100:1:1 without using the negative electrode additive.

Comparative Examples 2 and 3

A lithium ion secondary battery was prepared in the same manner as in Example 1, except that the negative electrode active material, the negative electrode additive, the binder, and the dispersant were mixed in the weight ratio of 100−x:x:1:1 (the values of x in the comparative examples are as shown in Table 1.).

(1) Measurement of Battery Capacity

The lithium ion secondary batteries prepared in the above Examples and Comparative Examples were charged with a constant current of 1CA until the battery voltage became 4.2 V, and subsequently charged with a constant voltage of 4.2 V. Charging was performed for a total of 2.5 hours. After 30 minutes of rest, the lithium ion secondary battery was discharged at a constant current of 0.02CA until the battery voltage became 2.9 V, and the discharge capacity was determined. The discharge capacity was defined as the battery capacity. The battery capacities of the lithium ion secondary batteries of Examples and Comparative Examples are shown in Table 1, the battery capacity of the lithium ion secondary battery of Comparative Example 1 being standardized as 100.

(2) Measuring DC Resistivity (DCR)

The lithium ion secondary battery was charged until the battery voltage became 4.2 V. Thereafter, 5% of the battery capacity was discharged. After two hours of rest, the open-circuit potential (OCV) of the lithium ion secondary batteries was measured. In the same manner, the discharging of 5% of the cell capacity and the measuring of OCV were repeated, and the relation between SOC and OCV was determined.

Based on the relation between SOC and OCV, the lithium ion secondary batteries were charged in a constant current-constant voltage (CC-CV) manner from SOC 0% to SOC 20%. The charging current during constant current charging was 1CA. Next, the lithium ion secondary battery was held in a thermostatic bath at −10° C. for 5 hours. Thereafter, the lithium ion battery was discharged at a constant current of 5CA for 10 seconds, and a voltage drop value due to the discharge was measured. Further, similar constant current discharges were performed with discharge currents 10CA and 15CA. The discharge current is plotted on the horizontal axis and the voltage drop value is plotted on the vertical axis, and the slope of the graph is determined as a DCR. The determined DCR is DCR in the low SOC range where SOC is 20% or less. The DCR of the lithium ion secondary batteries of Examples and Comparative Examples are shown in Table 1, the DCR of the lithium ion secondary battery of Comparative Example 1 being standardized as 100. The lower the DCR, the lower the internal resistance of the lithium ion secondary cell in the low SOC region.

TABLE 1

| | Negative electrode additive | x | Battery capacity (relative) | DCR (relative) |
|---|---|---|---|---|
| Example 1 | Cu₂O | 0.5 | 99 | 93 |
| Example 2 | Cu₂O | 0.9 | 98 | 84 |
| Example 3 | Cu₂O | 1.4 | 98 | 75 |
| Example 4 | Cu₂O | 12 | 84 | 41 |
| Example 5 | Cu₂O | 15 | 80 | 40 |
| Example 6 | CuO | 0.5 | 98 | 84 |
| Example 7 | CuO | 0.78 | 98 | 75 |
| Example 8 | CuO | 6.7 | 84 | 41 |
| Comparative Example 1 | — | 0 | 100 | 100 |
| Comparative Example 2 | Cu₂O | 0.3 | 99 | 95 |
| Comparative Example 3 | Cu₂O | 20 | 73 | 39 |

The lithium ion secondary batteries of Examples 1 to 8 in which x was in the range of 0.5 to 15 exhibited lower DCR than Comparative Examples 1 and 2 in which x was 0 and 0.3, respectively, and higher battery capacity than Comparative Example 3 in which x was 20.

Among Examples 1 to 5 using Cu₂O particles as the negative electrode additive, the lithium ion secondary batteries of Examples 2 to 5 in which x was in the range of 0.9 to 15 exhibited a lower DCR (specifically, 85 or less), and the lithium ion secondary batteries of Examples 3 and 4 in which x was in the range of 1.4 to 12 exhibited particularly lower DCR (specifically, 75 or less) and a particularly higher battery capacity (specifically, more than 80).

Examples 6 to 8 using CuO particles as the negative electrode additive had x ranging from 0.5 to 8.3. In particular, the lithium ion secondary batteries of Example 7 and 8 in which x is in the range of 0.78 to 6.7, exhibited particularly low DCR (specifically, 75 or less) and particularly high battery capacities (specifically, more than 80).

All publications, patents, and patent applications cited herein are hereby incorporated by reference in their entirety.

REFERENCE SIGNS LIST

32 negative electrode
32a negative electrode current collector
32b negative electrode mixture layer
34 positive electrode
34a positive electrode current collector
34b positive electrode mixture layer
100 lithium ion secondary battery

The invention claimed is:

1. A lithium ion secondary battery comprising:
a positive electrode comprising a positive electrode mixture containing a positive electrode active material represented by formula (1):

$$Li_{1+x}M^4O_2 \qquad (1),$$

where (X satisfies −0.15≤X≤0.15 and $M^4$ represents a group of elements including at least one selected from the group consisting of Manganese (Mn), Aluminum (Al), Nickel (Ni), and Cobalt (Co); and
a negative electrode comprising a negative electrode mixture,
wherein the negative electrode mixture comprises: a negative electrode active material containing a carbon-based material, a negative electrode additive containing a copper oxide, and a binder,
wherein the negative electrode active material comprises electrically connected particulate material that suppresses increases in an internal resistance of the lithium ion secondary battery,
wherein the negative electrode mixture contains the copper oxide in an amount of 0.5 wt % or more and 15 wt % or less based on a total weight of the negative electrode active material and the negative electrode additive, and
wherein the negative electrode additive has a median diameter smaller than a median diameter of the negative electrode active material and within the range of 1 μm to 10 μm.

2. The lithium ion secondary battery according to claim 1, wherein the copper oxide is Cu₂O, and
wherein the negative electrode mixture contains the copper oxide in the amount of 0.9 wt % or more and 15 wt % or less based on the total weight of the negative electrode active material and the negative electrode additive.

3. The lithium ion secondary battery according to claim 2, wherein the negative electrode mixture contains the copper oxide in the amount of 1.4 wt % or more and 12 wt % or less based on the total weight of the negative electrode active material and the negative electrode additive.

4. The lithium ion secondary battery according to claim 1, wherein the copper oxide is CuO, and
wherein the negative electrode mixture contains the copper oxide in the amount of 0.5 wt % or more and 8.3 wt % or less based on the total weight of the negative electrode active material and the negative electrode additive.

5. The lithium ion secondary battery according to claim 4, wherein the negative electrode mixture contains the copper oxide in the amount of 0.78 wt % or more and 6.7 wt % or less based on the total weight of the negative electrode active material and the negative electrode additive.

6. The lithium ion secondary battery according to claim 1, wherein both the negative electrode active material and the negative electrode additive are particulate, and wherein the negative electrode active material and the negative electrode additive are separate particles that are not composited with each other.

7. A manufacturing method for a negative electrode for a lithium ion secondary battery, the manufacturing method comprising the steps of:

preparing a mixture of a negative electrode active material containing a carbon-based material, a negative electrode additive containing a copper oxide, and a binder; and applying the mixture to a negative electrode current collector;

wherein the mixture contains the copper oxide in an amount of 0.5 wt % or more and 15 wt % or less based on the total weight of the negative electrode active material and the negative electrode additive, and wherein the negative electrode additive has a median diameter smaller than the median diameter of the negative electrode active material and within the range of 1 to 10 μm wherein the negative electrode active material comprises electrically connected particulate material that suppresses increases in an internal resistance of the lithium ion secondary battery.

8. The manufacturing method according to claim 7, wherein the negative electrode active material and the negative electrode additive are separate particles which are not composited with each other.

9. The lithium ion secondary battery according to claim 1, wherein $M^4$ comprises Zirconium (Zr) to reduce the internal resistance of the lithium ion secondary battery.

10. The lithium ion secondary battery according to claim 1, wherein the negative electrode active material are electrically connected particulate material without inhibiting the negative electrode additive having a high electrical resistance.

11. A lithium ion secondary battery comprising:

a positive electrode comprising a positive electrode mixture containing a positive electrode active material represented by the following formula (1):

$$Li_{1+x}M^4O_2 \tag{1},$$

where X satisfies $-0.15 \leq X \leq 0.15$ and $M^4$ represents a group of elements including at least one selected from the group consisting of Manganese (Mn), Aluminum (Al), Nickel (Ni), and Cobalt (Co); and a negative electrode comprising a negative electrode mixture, wherein the negative electrode mixture comprises, as separate particulates:

containing a negative electrode active material containing electrically connected particulate material that suppresses increases in an internal resistance of the lithium ion secondary battery, a negative electrode additive containing a copper oxide, and a binder, wherein the negative electrode mixture contains the copper oxide in an amount of 0.5 wt % or more and 15 wt % or less based on a total weight of the negative electrode active material and the negative electrode additive, and wherein the lithium ion secondary battery comprises a discharging capacity and the internal resistance affected by a low state of charge range.

* * * * *